United States Patent [19]

Kuroda et al.

[11] Patent Number: 5,079,273

[45] Date of Patent: Jan. 7, 1992

[54] DULLED STRETCHED MOLDING AND PROCESS FOR PRODUCING THE SAME

[75] Inventors: Takashi Kuroda; Kazuhiro Yamada; Tadao Ishibashi, all of Ichiharashi, Japan

[73] Assignee: Chisso Corporation, Tokyo, Japan

[21] Appl. No.: 498,417

[22] Filed: Mar. 26, 1990

[30] Foreign Application Priority Data

Apr. 7, 1989 [JP] Japan ..................... 1-88506
Apr. 13, 1989 [JP] Japan ..................... 1-94142

[51] Int. Cl.$^5$ ............... C08L 53/00; C08L 23/14; C08L 45/00; C08L 5/18; B29C 55/02
[52] U.S. Cl. ..................... 521/139; 521/140; 525/97; 525/192; 525/211; 264/210.1; 264/210.7; 264/331.7; 264/210.6; 264/290.2; 264/288.8; 264/41; 528/348.1
[58] Field of Search ............... 525/97, 211; 521/140, 521/139; 264/210.7, 210.1

[56] References Cited

U.S. PATENT DOCUMENTS

| | | | |
|---|---|---|---|
| 3,278,646 | 10/1966 | Lambert | 260/897 |
| 3,663,488 | 5/1972 | Kail | 525/210 |
| 3,773,609 | 11/1973 | Haruta et al. | 356/272 |
| 4,230,767 | 10/1980 | Isaka et al. | 428/439 |
| 4,869,938 | 9/1989 | Usami et al. | 525/240 |
| 4,927,885 | 5/1990 | Hayashida et al. | 525/211 |

FOREIGN PATENT DOCUMENTS

| | | |
|---|---|---|
| 3144911 | 5/1983 | Fed. Rep. of Germany . |
| 3821581 | 12/1989 | Fed. Rep. of Germany . |
| 48-21354 | 6/1973 | Japan . |
| 59-68340 | 4/1984 | Japan . |
| 60-163949 | 8/1985 | Japan . |
| 63-035642 | 2/1988 | Japan . |
| 64995 | 1/1989 | Japan . |
| 1-25503 | 5/1989 | Japan . |
| 1-171923 | 7/1989 | Japan . |
| 2-47037 | 2/1990 | Japan . |

*Primary Examiner*—Carman J. Seccuro
*Attorney, Agent, or Firm*—Leydig, Voit & Mayer

[57] ABSTRACT

The disclosed dulled stretched molding of at most 30% in gloss value, which is useful as a general-purpose packaging material, printing paper, tracing paper, etc., is produced from a composition comprising 100 parts by weight of a propylene-ethylene lock copolymer and 3 to 40 parts by weight of a cyclopentadiene type petroleum resin having a ring and ball softening point of at least 160° C. through melt extrusion thereof and stretching of the resulting flat extrudate.

There also is disclosed a heat-shrinkable foamed molding of at most 0.85 in density and at least 10% in heat shrinkability at 100° C., which is useful as a packaging material, a tying material, a label material, etc. This heat-shrinkable foamed molding is produced from a composition comprising a crystalline propylene-α-olefin copolymer having a crystal melting point of at most 150° C. and 5 to 40 wt. %, based on the copolymer, of a hydrogenated cyclopentadiene type resin having a ring and ball softening point of at least 160° C. through melt extrusion thereof and stretching of the resulting flat extrudate.

10 Claims, No Drawings

DULLED STRETCHED MOLDING AND PROCESS FOR PRODUCING THE SAME

BACKGROUND OF THE INVENTION

1. Field of the Invention

The present invention relates to a stretched molding comprising a propylene-ethylene block copolymer as the main component, and a process for producing the same. More particularly, the invention relates to a surface-roughened stretched molding of the kind as described above to which a dull tone has been imparted, and a process for producing the same which comprises stretching a flat molding formed from a composition comprising a propylene-ethylene block copolymer and a specific petroleum hydrocarbon resin added thereto to form an plurality of microvoids on the inside and surface of the flat molding.

The present invention further relates to a heat-shrinkable foamed molding and a process for producing the same. More particularly, the invention relates to a heat-shrinkable foamed molding formed from a specific propylene-α-olefin copolymer and a specific hydrogenated cyclopentadiene resin having a high softening point, and a process for producing the same.

2. Description of the Prior Art

In general, surface-roughened flat plastic moldings, for example, in the form of a monoaxially or biaxially stretched film, are widely used as polychromatic paper, tracing paper, release paper, general-purpose packaging paper etc.

Conventional processes for roughening the surface of a molding include a filler addition method wherein a large amount of an inorganic filler such as calcium carbonate, silica or sodium silicate is added to a molding material; a post-treatment method wherein a molding is treated with a solvent or a chemical to be dulled; and a coating method wherein a molding is coated with a matte coating film. The filler addition method is defective in that addition of a large amount of an inorganic filler to a molding material is liable to cause sharp reduction in the flowability, during extrusion, of the material. This method results in clogging of a screen bag, failure in obtaining products having a roughened surface with a high density of unevenness because of its liability to cause moisture absorption and foaming of the material attributable to the inorganic filler as well as poor dispersion of the inorganic filler, etc. The post-treatment method is economically disadvantageous because of the necessity of a step of removing a solvent or a chemical from a molding after the treatment thereof with the solvent or the chemical, while the coating method is also economically disadvantageous because of the necessity of investment in coating equipment and facilities related thereto. Furthermore, the latter two methods are defective in that products are very liable to undergo damage due to wear because the improvement attained by these methods is directed only to the surfaces of moldings.

Other known processes for modifying the surface of a film include a lamination method wherein a film of a blend composition comprising polypropylene and high-density or low-density polyethylene is laminated on a polypropylene film, and a lamination method wherein a film of a propylene-ethylene block copolymer alone is laminated on a polypropylene film (see Japanese Patent Publication No. 32,954/1982). However, lamination of either of the above-mentioned two types of films is defective, for example, in that the resulting laminated film has too rough a surface without a high density of unevenness.

Heat-shrinkable foamed moldings in the form of a foamed sheet or a foamed film are used as packing materials, tying materials, materials of labels for containers such as glass bottles, plastic bottles and metallic cans and materials for protective covers attached to the peripheries or bottoms of bottles to keep the bottles from breaking. The use of such heat-shrinkable foamed moldings allows not only thin-walled bottles to be produced, but also the display effect of beautiful printing to be utilized.

Such foamed moldings have been predominantly formed from polystyrene as the starting material thereof. Since polystyrene is weak and brittle against impact due to the characteristics thereof as a starting material. However, stretching of polystyrene in the course of production of a heat-shrinkable foamed molding is liable to entail fracture thereof at around the grips of a tenter and the like because of the brittleness inherent in polystyrene. Furthermore, it is widely known that foamed moldings of polystyrene obtained as products involve disadvantages including breakage thereof during the course of a bottle-washing step, a filling step, a conveying step, etc. when they are used in the form of a label attached to a bottle or the like, and failure in preventing dangerous scattering of shards of a bottle broken upon dropping because of the brittleness of polystyrene when they are used in the form of a protective cover for the bottle.

Foamed moldings proposed with a view to obviating the disadvantages of such foamed polystyrene moldings include laterally-stretched foamed moldings, heat-shrinkable in the lateral direction, which is formed from a blend composition comprising an ethylene-propylene copolymer containing propylene monomer units as the main component, a specific elasticity-modifying polymer and a decomposition type foaming agent (see Japanese Patent Publications Nos. 22,787/1987 and 33,251/1987).

There has further been proposed an heat-shrinkable foamed film formed from a blended composition comprising a propylene type polymer, high-density polyethylene and a decomposition type foaming agent (see Japanese Patent Laid-Open No. 13,440/1987).

These known foamed moldings all went through melt extrusion at a high temperature of at least the melting or softening point of each corresponding composition to make the decomposition type foaming agent form cells of foam, however, they are defective, for example, in that the cells of foam therein are not uniform, and in that there is difficulty in controlling the conditions of production thereof as can be seen from the tendency of a raw film to be broken or too roughened on the surfaces thereof by stretching thereof to permit beautiful printing on the resulting product.

Furthermore, these moldings incur problems including a lower heat shrinkability at the time of forming than foamed polyestyrene moldings. These defects and problems have been serious obstacles to the expansion of use of propylene copolymers.

SUMMARY OF THE INVENTION

As a result of extensive investigations with a view to eliminating the above-mentioned defects of the foregoing conventional processes and thereby providing a process for producing a low-gloss molding having a matte-tone roughened surface with a high density of unevenness, the inventors of the present invention have found that a flat molding formed from a blend composition comprising a propylene-ethylene block copolymer and a specific cyclopentadiene type petroleum resin at a specified weight concentration when stretched under specified conditions, can provide a very beautiful dull-tone molding having a surface with a very high density of unevenness. Thus, the dulled stretched molding of the present invention has been materialized.

As a result of further extensive investigations with a view to providing a heat-shrinkable foamed molding and a process for producing the same wherein the aforementioned defects of the prior art are eliminated, the authors of the present invention have found that a blend composition comprising a specific propylene-based copolymer and a specific hydrogenated cyclopentadiene type resin at a specified weight concentration, when melt-extruded and then stretched, can provide a heat-shrinkable foamed molding with fine cells of foam excellent in surface gloss and improved in heat shrinkability even without the use of any decomposition type foaming agent. Thus, the heat-shrinkable foamed molding of the present invention has been materialized.

More specifically, in accordance with the present invention, there are provided:

(1) a dulled stretched molding produced by melt-kneading and melt-extruding a blend composition comprising 100 parts by weight of a propylene-ethylene block copolymer and 3 to 40 parts by weight of a cyclopentadiene type petroleum resin having a ring and ball softening point of at least 160° C. and stretching the resulting flat molding in at least one direction in such a way as to make the resulting stretched molding have a roughened surface of at most 30% in gloss value with a high density of unevenness;

(2) a process for producing a stretched molding, comprising the step of melt-extruding a blend composition comprising 100 parts by weight of a propylene-ethylene block copolymer and 3 to 40 parts by weight of a cyclopentadiene type petroleum resin having a ring and ball softening point of at least 160° C. to form a raw sheet and the step of stretching the raw sheet in at least one direction at a draw ratio of at least 2 at a stretching temperature of at most the ring and ball softening temperature of the cyclopentadiene type petroleum resin;

(3) a heat-shrinkable foamed molding of at most 0.85 in density and at least 10% in heat shrinkability at 100° C., produced by melt-kneading and melt-extruding a blend composition comprising a crystalline propylene-α-olefin copolymer having a crystal melting point of at most 150° C. and 5 to 40 wt. %, based on the crystalline propylene-α-olefin copolymer, of a hydrogenated cyclopentadiene type resin having a ring and ball softening point of at least 160° C. and stretching the resulting extrudate in at least one direction;

(4) A process for producing a heat-shrinkable foamed molding, comprising the step of melt-extruding a blend composition comprising a crystalline propylene-α-olefin copolymer having a crystal melting point of at most 150° C. and 5 to 40 wt. %, based on the crystalline propylene-α-olefin copolymer, of a hydrogenated cyclopentadiene type resin having a ring and ball softening point of at least 160° C. to form a raw sheet and the step of stretching the raw sheet in at least one direction at a draw ratio of at least 3 at a stretching temperature 10° C. or more lower than the crystal-melting point of the copolymer;

(5) a heat-shrinkable foamed molding and a process for producing the same as set forth in the above items (3) and (4), respectively, wherein the crystalline propylene-α-olefin copolymer contains at least 70 wt. % of propylene monomer units, has a melt flow rate (MFR) of 0.1 to 10, and is at least one member selected from among a crystalline ethylene-propylene random copolymer, a crystalline propylene-butene-1 copolymer, a crystalline ethylene-propylene-butene-1 copolymer, and a crystalline ethylene-propylene-hexene-1 copolymer;

(6) a heat-shrinkable foamed molding and a process for producing the same as set forth in the above items (3) and (4), respectively, wherein the hydrogenated cyclopentadiene type resin is at least one member selected from among a hydrogenated cyclopentadiene polymer, a hydrogenated dicyclopentadiene polymer, hydrogenated copolymers of cyclopentadiene with at least one aromatic hydrocarbon, and hydrogenated copolymers of dicyclopentadiene with at least one aromatic hydrocarbon; and (7) a heat-shrinkable foamed molding and a process for producing the same as set forth in the above items (3) and (4), respectively, wherein the blend composition comprises such a propylene-α-olefin copolymer and such a hydrogenated cyclopentadiene type resin as to provide a difference of at least 20° C. between the crystal melting point of the former and the ring and ball softening point of the latter.

DETAILED DESCRIPTION OF PREFERRED EMBODIMENTS

The propylene-ethylene block copolymer to be used in the dulled stretched molding of the present invention may generally be prepared either by a two-stage polymerization process comprising a first stage of propylene-rich polymerization which may involve copolymerization thereof with at most 1 wt. % of ethylene and a second stage of ethylene-rich polymerization, or by a multi-stage polymerization process wherein the above-mentioned first and second stages are repeated alternately. However, the preparation of the above-mentioned copolymer is not particularly restricted in respect of the method of polymerization thereof. For example, there are known such methods as respectively disclosed in Japanese Patent Laid-Open Nos. 69,215/1983, 116,716/1980, 29,811/1983 and 195,718/1982, which are all employable. The propylene/ethylene ratio is also not particularly restricted. For example, preferred is a propylene-ethylene block copolymer having a melt flow rate of 0.1 to 20 g/10 min and a block index of at least 0.6 in terms of the ratio of absorbance at 720 cm$^{-1}$ to that at 731 cm$^{-1}$ as determined using an infrared spectrophotometer when the ethylene unit content is 2 to 20 wt. %.

If crystalline polypropylene is used instead of the propylene-ethylene block copolymer, a large amount of the cyclopentadiene type petroleum resin must be blended therewith in a molding composition in order to produce therefrom an opaque molding, which, however, is a highly brilliant product unlike the dulled stretched molding of the present invention, the aim of which is to give thereto a roughened surface with a dull tone. Even if the amount of the above-mentioned petroleum resin to be blended in the molding composition is decreased, molding of the composition can only provide a film product of low commercial value with an insufficient opaquness as well as with an uneven surface, which looks as if it contains nonuniform foreign particles. Thus, in this case, a desired low-gloss rough surface with a matte tone cannot be secured unlike in the dulled stretched molding of the present invention.

As the cyclopentadiene type petroleum resin to be used in the dulled stretched molding of the present invention, there can be mentioned cyclopentadiene type petroleum resins prepared by at least a few hours of heat polymerization of a cyclopentadiene fraction obtained, for example, through steam cracking of petroleum naphtha or the like and comprising as the main component cyclopentadiene, dicyclopentadiene, a polymer thereof, an alkyl-substituted derivative(s) thereof or a mixture thereof in the presence or absence of a solvent under an atmosphere of an inert gas such as nitrogen gas at a temperature of preferably 220° to 320° C. under such a pressure as can at least keep the polymerization system in a liquid phase; hydrogenated cyclopentadiene type petroleum resins prepared from a cyclopentadiene type petroleum resin as mentioned above through hydrogenation thereof according to a known method wherein hydrogenation is effected in a solvent in the presence of a metallic or metallic oxide catalyst such as palladium, nickel, cobalt or an oxide thereof at a temperature of 150° to 320° C. under a hydrogen pressure of 10 to 150 kg/cm; and mixtures thereof.

The polymerization of the above-mentioned cyclopentadiene fraction may be done either continuously or batch-wise and either in one stage or in two or more stages. In the case of preparation of a hydrogenated cyclopentadiene type petroleum resin, the polymerization of the cyclopentadiene fraction and the subsequent hydrogenation of the resulting polymer may be done either continuously or batch-wise.

The cyclopentadiene type petroleum resin to be used in the dulled stretched molding of the present invention is required to have a ring and ball softening point of at least 160° C. When use is made of a cyclopentadiene type petroleum resin having a ring and ball softening point of lower than 160° C., a glossy molding with insufficient dullness is obtained, which is not a stretched molding adapted for the purpose of the present invention. When use is made of a cyclopentadiene type petroleum resin having a ring and ball softening point of at most 150° C., there cannot be obtained a characteristic dull-tone stretched molding having a roughened surface with a high density of unevenness, which is adapted for the purpose of the present invention, and there is instead obtained a high-gloss molding totally contrary to the aim of the present invention.

A hydrogenated cyclopentadiene type petroleum resin having a ring and ball softening point of at least 160° C. is preferably used for the production of the dulled stretched molding of the present invention. Especially preferred are hydrogenated cyclopentadiene type petroleum resins having a ring and ball softening point of 170° to 200° C. and a bromine number of at most 20. This is so because they are excellent in compatibility with the propylene-ethylene block copolymer as to ensure a stable processability, and are capable of providing a stretched molding with an excellent dull tone.

With 100 parts by weight of the propylene-ethylene block copolymer is blended 3 to 40 parts by weight of the cyclopentadiene type petroleum resin having a ring and ball softening point of at least 160° C. to prepare a composition for use in the production of the dulled stretched molding of the present invention. When the amount of the above-mentioned petroleum resin is smaller than 3 parts by weight, the dulling effect sought in the dulled stretched molding of the present invention is unsatisfactory. When the amount of the petroleum resin exceeds 40 parts by weight, the productivity is unfavorably lowered to an extreme extent because extrusion molding tends to be accompanied by extrusion nonuniformity while rupture of the molding is liable to occur in the course of stretching. In order to produce dulled stretched moldings with high productivity, the aforementioned hydrogenated cyclopentadiene type petroleum resin having a ring and ball softening point of 170° to 200° C. is especially preferably used in an amount ranging from 5 to 30 parts by weight.

In the composition for use in the production of the dulled stretched molding of the present invention, the propylene-ethylene block copolymer and the cyclopentadiene type petroleum resin as the essential components may be blended with any of various additives known in the art to be capable of being added to propylene-ethylene block copolymers, such as processing stabilizers, anti-oxidizing agents, slip agents, antistatic agents, and other various polymers, if necessary.

The above-mentioned composition can be easily prepared by mixing the above-mentioned copolymer with the above-mentioned petroleum resin and, if necessary, other additive(s) by means of a common blender, a Henschel mixer (trade name) or the like. Alternatively, the use of an extruder, a Banbury mixer or the like capable of mixing the copolymer with the petroleum resin in a molten state is especially preferable since a composition in a serviceable form of pellets can be prepared. It also is efficient to blend the propylene-ethylene block copolymer or other resin(s) (e.g., HDPE, LDPE and L-LDPE) with a large amount of the petroleum resin to prepare a master batch, which is blended with the propylene-ethylene block copolymer in such a way as to prepare a composition in agreement with a predetermined formulation.

The composition thus obtained is melt-extruded into a flat molding, or a raw sheet, which is then monoaxially or biaxially stretched by a known method to produce a dulled stretched molding according to the present invention.

Employable stretching methods include known monoaxial stretching methods such as roll stretching, oven stretching, and hot plate stretching; and known simultaneous or consecutive biaxial stretching methods such as tubular stretching and tenter stretching. The temperature of the raw sheet during the course of stretching must be set lower than the ring and ball softening point of the petroleum resin contained in the composition thereof. A choice of such conditions enables the resulting stretched molding to have a dulled surface with a gloss value of at most 30%.

It is impossible to effect stretching or orientation at a temperature equal to or higher than the melting point of the propylene-ethylene block copolymer. In the case of stretching in an oven or in a similar case, nevertheless, the temperature of hot air may sometimes be set the same as or higher than the melting point of the propylene-ethylene block copolymer. This is possible because the actual stretching temperature does not reach the melting point of the propylene-ethylene block copolymer. This has much to do with the thickness of the raw sheet being stretched and the time of passage thereof through the oven or the like, associated with the thermal conductivity of the raw sheet. In this sense, the term "stretching temperature" used herein refers to the actual temperature of the raw sheet being stretched.

The dulled stretched molding of the present invention can be obtained by stretching the raw sheet in at least one direction at a draw ratio of at least 2 at a temperature of at most the ring and ball softening point of the petroleum resin contained in the composition. The stretching is preferably effected at a draw ratio of at least 4. It is especially preferable to effect simultaneous or consecutive biaxial stretching of the raw sheet at a high draw ratio of about 10 to about 60.

The dulled stretched molding of the present invention is characterized by a gloss value of at most 30%. When the gloss value of a stretched molding exceeds 30%, the stretched molding has some shininess with no dull tone. The gloss value of a stretched molding according to the present invention is especially preferably at most 20% since such a molding has a roughened surface excellent in dull tone with a high density of unevenness.

The dulled stretched molding of the present invention may further be surface-treated through a corona treatment, a plasma treatment or the like under an atmosphere of air, oxygen, nitrogen or the like if necessary.

The crystalline propylene-α-olefin copolymer to be used in the heat-shrinkable foamed molding of the present invention is a binary or more copolymer comprising propylene monomer units and ethylene or $C_4$-$C_{10}$ aolefin monomer units and having a crystal melting point of at most 150° C. Especially preferred are crystalline random copolymers of propylene with ethylene or a $C_4$-$C_8$ α-olefin, containing at least 70 wt. % of propylene monomer units and having a crystal melting point of 120 to 145 ° C. Those copolymers having a crystal melting point exceeding 150° C. require a higher stretching temperature and provide a foamed molding insufficient in both heat shrinkability and degree of foaming, which is unsatisfactory in light of the purpose of the present invention.

The term "crystal melting point" used herein refers to a temperature at a peak which appears to the accompaniment of crystal melting in an endothermic curve obtained using a scanning differential calorimeter wherein 10 mg of a sample is slowly heated up under an atmosphere of nitrogen at a temperature rise rate of 10 C°/min.

The crystalline propylene-α-olefin copolymer to be used in the heat-shrinkable foamed molding of the present invention is prepared by random copolymerization of propylene with ethylene or a $C_4$-$C_{10}$ α-olefin as a comonomer while controlling the above-mentioned comonomer content above a given level. For example, a crystalline ethylene-propylene random copolymer having a crystal melting point of at most 150° C. can be obtained when the ethylene comonomer content exceeds 2.5-3 wt. % though it may slightly fluctuate with the condition of randomness of the resulting copolymer.

Additionally stated, an ethylene-propylene block copolymer prepared by random copolymerization of propylene with ethylene according to a two-stage or higher multi-stage polymerization process wherein polymerization of a large amount of propylene in the first stage is followed by copolymerization of propylene with ethylene in the second stage and a subsequent stage(s), if any, generally has a crystal melting point of 150° C. or higher (another low peak appears as a secondary peak at around 125°-130° C. in an endothermic curve).

Even in multi-stage polymerization, however, random copolymerization of propylene with ethylene at the first stage instead of homopolymerization of polypylene, followed by random copolymerization of propylene with ethylene in the second stage and a subsequent stage(s), if any, provides a crystalline random block copolymer which can be used in the present invention since it has a crystal melting point of at most 150° C.

The foregoing copolymer to be used in the heat-shrinkable foamed molding of the present invention can be prepared by random copolymerization of propylene as the main monomer component with ethylene or an α-olefin having 4 or more carbon atoms in the presence of such a catalyst as is useful in common polymerization to prepare crystalline polypropylene, e.g., a Ziegler-Natta catalyst, according to a known method.

Specific examples of the propylene-α-olefin copolymer include crystalline ethylene-propylene copolymers, crystalline propylene-butene-1 copolymers, and ethylene-propylene-hexene-1 copolymers.

The melt flow rate (MFR) of the propylene-α-olefin copolymer is preferably in the range of 0.1 to 20, especially preferably in the range of 0.3 to 10.

As the starting material of the hydrogenated cyclopentadiene resin to be added to the propylene-α-olefin copolymer in the course of production of the heat-shrinkable foamed molding of the present invention, there can be mentioned cyclopentadiene type petroleum resins prepared by at least a few hours of heat polymerization of a cyclopentadiene fraction obtained, for example, through steam cracking of petroleum naphtha or the like and comprising as the main component cyclopentadiene, dicyclopentadiene, a polymer thereof, an alkyl-substituted derivative(s) thereof or a mixture thereof in the presence or absence of a solvent under an atmosphere of an inert gas such as nitrogen gas at a temperature of preferably at least 220° C. under such a pressure as can at least keep the polymerization system in a liquid phase; copolymers of the above-mentioned cyclopentadiene fraction with an aromatic monovinyl hydrocarbon(s) and/or other aromatic hydrocarbon(s) copolymerizable therewith such as an indene compound(s), prepared by heat copolymerization thereof under substantially the same conditions as described above; and mixtures thereof.

The polymerization of the cyclopentadiene fraction optionally together with other comonomer(s) may be effected in one stage, but may alternatively be effected in two or more stages with a view to efficiently raising the softening point of the resulting (co)polymer.

The hydrogenated cyclopentadiene type resin to be used in the heat-shrinkable foamed molding of the present invention is a high softening point resin which may be prepared from the above-mentioned cyclopentadiene type polymer or copolymer according to a known method of hydrogenation in a solvent in the presence of a metallic or metallic oxide catalyst such as palladium, nickel, cobalt or an oxide thereof at a temperature of at least 150° C. under a pressure of at least 10 kg/cm² in such a way as to have a ring and ball softening point of at least 160° C. A hydrogenated cyclopentadiene type resin having a ring and ball softening point lower than 160° C. provides a stretched molding with an insufficient degree of foaming, and a hydrogenated cyclopentadiene type resin having a ring and ball softening point of at most 150° C. provides only a transparent heat-shrinkable film not foamed at all.

A heat-shrinkable film comprising a propylene-α-olefin copolymer and a petroleum resin or a hydrogenated petroleum resin similar to the hydrogenated cyclopentadiene type resin to be used in the present invention is disclosed in Japanese Patent Laid-Open No. 4,735/1987. However, a film comprising a petroleum resin or a hydrogenated petroleum resin added thereto and having a softening point of 80° to 150° C. as disclosed in that patent literature is not foamed at all. As described in Japanese Patent Laid-Open No. 62,846/1987 related to an invention with the same purpose as that of the former patent literature, none other than a film with such a transparency as to enable the birefringence thereof to be measured with a refractometer can be obtained using such a petroleum resin or a hydrogenated petroleum resin, which therefore cannot be used at all in the present invention.

Among usable hydrogenated cyclopentadiene type resins having a ring and ball softening point of at least 160° C., those resins having a ring and ball softening point of 165° to 200° C. and a bromine number of at most 20 are especially preferable from the viewpoint of economy (productivity), compatibility with the propylene-α-olefin copolymer, the characteristics of the resulting foamed moldings, etc. in addition to their excellent processing stability and their capability of readily providing a foamed molding excellent in whiteness and surface gloss with fine uniform cell of foam easy of formation.

The aforementioned crystalline propylene-α-olefin copolymer is blended with 5 to 40 wt. %, based on the weight of copolymer, of the hydrogenated cyclopentadiene type resin to prepare a composition to be used in the production of the heat-shrinkable foamed molding of the present invention. When the amount of the resin is smaller than 5 wt. %, the degree of foaming is so low that the buffering action of the resulting foamed molding is unsatisfactory. When it exceeds 40 wt. %, extrusion nonuniformity is liable to occur during the course of extrusion molding to entail stretching nonuniformity and the like with a failure in securing uniform products. The amount of the hydrogenated cyclopentadiene type resin is especially preferably in the range of 7 to 25 wt. % from the viewpoint of foamability, productivity and the physical properties of products The hydrogenated cyclopentadiene type resin to be used in the heat-shrinkable foamed molding of the present invention must have a ring and ball softening point of at least 160° C. with a difference of at least 10° C between the ring and ball softening point thereof and the crystal melting point of the crystalline propylene-α-olefin copolymer to be used in combination therewith. With lack of either of the foregoing two requirements, no heat-shrinkable foamed moldings adapted for the purpose of the present invention can be obtained. Specifically, when the ring and ball softening point of the hydrogenated cyclopentadiene type resin is lower than 160° C., the degree of foaming in the resulting molding is insufficient even if the difference thereof from the crystal melting point of the above-mentioned copolymer is 10° C. or more. When it is 150° C. or lower, no foaming occurs in the resulting molding, which is therefore transparent, whatever the difference between the above-mentioned ring and ball softening point and the above-mentioned crystal melting point may be. On the other hand, when the above-mentioned difference is less than 10° C., the heat-shrinkability of the resulting molding is insufficient so as to make the molding useless even if the ring and ball softening point of the hydrogenated cyclopentadiene type resin is 160° C. or higher.

It is especially preferable to use a hydrogenated cyclopentadiene type resin having a ring and ball softening point of at least 160° C., desirably at least 165° C., with a difference of at least 20° C. between the ring and ball softening point thereof and the crystal melting point of the above-mentioned copolymer to be used in combination therewith.

In the foregoing composition for use in the production of the heat-shrinkable foamed molding of the present invention, the propylene-α-olefin copolymer and the hydrogenated cyclopentadiene type resin as the essential components may be blended with any of various additives known in the art to be capable of being added to propylene, such as processing stabilizers, antioxidizing agents, lubricants, slip agents, antistatic agents, and other various polymers, if necessary. Of course, a decomposition type foaming agent such as azodicarbonamide may be used in combination with the above-mentioned composition to further improve the degree of foaming. However, the composition for the production of the heat-shrinkable foamed molding of the present invention is characterized by its capability of being foamed even without the use of any decomposition type foaming agent, addition of which is rather undesirable from the viewpoint of avoidance of any restrictions on melt-extrusion conditions.

The above-mentioned composition can be easily prepared by mixing the components thereof by means of a common blender, a mixer, or the like. The use of an extruder, a Banbury mixer or the like capable of melt-kneading is especially preferable since a composition in the serviceable form of pellets can be obtained therewith. It also is practical to blend the above-mentioned copolymer and/or other resin(s) (e.g., HDPE, LDPE, and L-LDPE) with a large amount of the petroleum resin to prepare a master batch, which is then blended with the above-mentioned copolymer in such a way as to prepare a composition in agreement with a predetermined formulation.

The composition thus obtained is melt-extruded into a raw sheet, which is then monoaxially or biaxially stretched at a temperature of at most the crystal melting point of the propylene-α-olefin copolymer by a known method to produce a desired heat-shrinkable foamed molding according to the present invention.

Employable stretching methods include known monoaxial longitudinal stretching methods such as roll stretching, oven stretching, and hot plate stretching; and a lateral stretching method using a tenter; biaxial stretching methods wherein the foregoing two types of methods are combined; and known monoaxial or biaxial stretching methods using a tubular material as the material to be stretched. Biaxial stretching may be effected either simultaneously or consecutively When the temperature of the raw sheet during the course of stretching is set at least 20° C., preferably at least 30° C., lower than the ring and ball softening point of the hydrogenated cyclopentadiene petroleum resin contained in the composition used, products excellent in both the degree of foaming and uniformity can be obtained.

It is substantially impossible to effect stretching or orientation of a crystalline polymer at a temperature equal to or higher than the melting point thereof. In the case of stretching in an oven or in a similar case, however, the temperature of hot air as the heating source may sometimes be set the same as or higher than the melting point of the crystalline propylene-α-olefin copolymer. In this case, it is important that the actual temperature of the raw sheet being stretched should not reach the melting point of the crystalline propylene-α-olefin copolymer in connection with the thickness of the raw sheet being stretched and the time of heating thereof, associated with the thermal conductivity of the crystalline copolymer. Thus, the term "stretching temperature" used herein refers to the temperature of the raw sheet being stretched itself.

The heat-shrinkable foamed molding of the present invention can be obtained by stretching the raw sheet in at least one direction at a draw ratio of at least 3 at a temperature at least 10° C. lower than the crystal melting point of the crystalline propylene-α-olefin copolymer. When the heat-shrinkable foamed molding of the present invention is to be used as a material of protective covers for glass bottles and the like or as a material of display labels, the stretching is preferably effected monoaxially in a longitudinal or lateral direction at a draw ratio of 3 to 7. When it is to be used as a heat-shrinkable packaging material capable of tightly packaging an irregular-shaped article or a number of articles assembled, the stretching is especially preferably effected biaxially simultaneously in both longitudinal and lateral directions at a draw ratio of at least 3 according to a tubular stretching method.

During the course of extrusion, the composition for use in the production of the heat-shrinkable foamed molding of the present invention undergoes uniform microdispersion of the hydrogenated cyclopentadiene type resin, molten in the course of extrusion, into the crystalline propylene-α-olefin copolymer. The extruded composition in the form of a raw sheet is not foamed at all before stretching thereof. During the course of stretching of the raw sheet, the hydrogenated cyclopentadiene type resin is in a glassy, or vitreous, solid state because the stretching temperature is sufficiently lower than the ring and ball softening point of the resin. At the time of stretching, therefore, the hydrogenated cyclopentadiene type resin is not stretched, whereas the propylene-α-olefin copolymer is stretched. This entails separation of the copolymer from the hydrogenated cyclopentadiene type resin along the interfaces therebetween to form an innumerable number of microvoids. In this way, a so-called foamed molding having an innumerable number of microvoids on the inside thereof can be obtained, wherein the microvoids as cells of foam are very fine and uniform unlike in conventional foamed moldings wherein cells of foam have been formed with the decomposition gas of a foaming agent through decomposition thereof during the course of melt extrusion.

The heat-shrinkable foamed molding of the present invention has a density of at most 0.85 and a shrinkage at 100° C. of at least 10%. When the density exceeds 0.85, the buffering action and opaqueness of a foamed molding are unsatisfactory. When the shrinkage at 100° C. is lower than 10%, the heat shrinkability of a foamed molding is unsatisfactory from a practical point of view.

If necessary, the heat-shrinkable foamed molding of the present invention may be surface-treated under an atmosphere of air, oxygen, nitrogen or the like, for example, according to a corona treatment or a plasma treatment. The heat-shrinkable foamed molding of the present invention may be subjected, on the surface thereof, to printing or lamination of various materials.

EXAMPLES AND COMPARATIVE EXAMPLES

The following Examples will now illustrate the present invention in comparison with the following Comparative Examples, but should not be construed as limiting the scope of the invention. The methods of determination of characteristic values mentioned in the following Examples and Comparative Examples are as follows.

(1) Ring and ball softening point: in accordance with JIS K2207; (unit: °C).
(2) Bromine number: in accordance with JIS K2543 - 1979. It refers to how many grams of bromine are added to the unsaturated moieties of a substance contained in 100 g of the sample thereof.
(3) Gloss value: in accordance with ASTM D523 (angle: 20°).
(4) Melt flow rate (MFR): in accordance with JIS K7210 - 1976, Test Conditions 14 (230° C., 2.16 kgf); (unit: g/10 min).
(5) Ethylene unit content: calculated from an absorbance at 731 cm$^{-1}$ which is measured using an infrared spectrophotometer (Perkin-Elmer Model 783). The block index is calculated from a ratio of absorption intensity at 720 cm$^{-1}$ to absorption intensity at 731 cm$^{-1}$.
(6) Density: The weight per m$^2$ of a molding is measured and is converted into the weight per cm$^2$ of the molding, which is divided by the thickness thereof in terms of cm to obtain the value of density (unit: g/cm$^3$ thereof.
(7) Total light transmission: in accordance with JIS K6714.
(8) Heat shrinkability: A molding is cut into a sample strip of 10 mm in width and 100 mm in length, which is then dipped in a silicone bath kept at 100° C. for 30 seconds, followed by the measurement of the length (L) of the sample strip. The heat shrinkability is calculated according to the following equation.

$$\text{heat shrinkability}(\%) = \{(100-L)/100\} \times 100$$

Examples 1 to 5 and Comparative Examples 1 to 4

(Examples 1, 2 and 3)

0.1 part by weight of a phenolic anti-oxidizing agent BHT, 0.1 part by weight of calcium stearate, and a predetermined amount of a hydrogenated cyclopentadiene type petroleum resin as listed in Table 1 were added to 100 parts by weight of a propylene-ethylene block copolymer powder having an MFR of 1.5, an ethylene unit content of 8 wt. % and a block index of 0.8, followed by mixing by means of a Henschel mixer. The resulting mixture was passed through an extruder to effect melt-mixing at 250° C. The molten mixture was cooled and cut to prepare a composition in the form of pellets.

The composition was melt-extruded through an extruder of 40 mm in cylinder diameter and a T die of 30 mm in width at a temperature of 250° C. and then quickly cooled with mirror-surfaced cooling rolls kept at 45° C. to form an unstretched raw sheet of 0.75 mm in thickness.

Subsequently, the raw sheet was cut into a square piece, which was then preheated with a pantograph type biaxial stretcher at a temperature of 153° C. for 60 seconds. The preheated raw sheet was stretched with the above-mentioned stretcher five-fold in each of longitudinal and lateral directions simultaneously in both directions at a temperature of 153° C., followed by a heat treatment under tension at 153° C. for 20 seconds. According to the foregoing procedure, nine kinds of biaxially stretched films were obtained. The characteristic values of these biaxially stretched films are listed in Table 1.

Additionally stated, cyclopentadiene type petroleum resins as starting materials of hydrogenated cyclopentadiene type petroleum resins were prepared by customary polymerization of cyclopentadiene, dicyclopentadiene or the like obtained by steam cracking of naphtha, and hydrogenated in the presence of a nickel type catalyst under a hydrogen pressure of 80 kg/cm$^2$ at a temperature of 250° C. to prepare the respective hydrogenated cyclopentadiene type petroleum resins, which were used as starting materials for the production of the above-mentioned biaxially stretched films.

(Examples 4 and 5)

In Examples 4 and 5, biaxially stretched films were formed according to substantially the same procedure as in Examples 1, 2 and 3 except that the propylene-ethylene block copolymer used in Examples 1, 2 and 3 was replaced with a propylene-ethylene block copolymer having an MFR of 1.0, an ethylene unit content of 12 wt. % and a block index of 1.6 which was used in combination with respective hydrogenated cyclopentadiene type petroleum resins having a ring and ball softening point and a bromine number, at least one of which was different from those of the petroleum resins used in Examples 1, 2 and 3, to prepare respective compositions.

(Comparative Examples 1 and 2)

In Comparative Examples 1 and 2, a propylene homopolymer having an MFR of 2.5 was used instead of the propylene-ethylene block copolymer used in Example 2. In Comparative Example 1, 5 parts by weight of the same petroleum resin as used in Example 2 was used instead of 10 parts by weight thereof used in Example 2. In Comparative Example 2, the same amount of the same petroleum resin as used in Example 2 was used. Substantially the same procedure as in Example 2 except for the foregoing conditions was repeated. Thus, two kinds of biaxially stretched films were formed.

(Comparative Examples 3 and 4)

Petroleum resins of substantially the same type as used in the present invention except that the ring and ball softening points thereof were below the range as specified for the present invention were respectively used in an amount of 15 parts by weight in Comparative Examples 3 and 4. Substantially the same procedure as in Example 2, except for the foregoing conditions, was repeated. Thus, two kinds of biaxially stretched films were formed.

As is apparent from Table 1, the biaxially stretched films of Examples 1 to 5 according to the present invention were greatly reduced in gloss value with a peculiar low-brightness dull-tone hand.

In contrast, both of the biaxially stretched films of Comparative Examples 1 and 2 with the use of the propylene homopolymer in combination with the same petroleum resin as in Example 2, even when used in the same amount as in Example 2, had a gloss value exceeding 60%. The same is true of both of the biaxially stretched films of Comparative Examples 3 and 4 with the use of the respective petroleum resins having a ring and ball softening point lower than that specified in the present invention, which films in particular had a gloss value conspicuously much higher than those of the stretched films according to the present invention. Thus, it will be understandable that the use of a starting material(s) other than those specified in the present invention cannot give a stretched film product a desired performance adapted for the purpose of the present invention.

The stretched films of Examples 1 to 5 were all roughened in the surface with a high density of unevenness to have a gloss value lower than 20% and a peculiar beautiful dull-tone hand without shininess. Thus, they were excellent films.

The dulled stretched molding of the present invention in the form of a film, a yarn, a filament, a hollow container formed through stretching blow molding, etc. is useful in a wide variety of use applications, including a general-purpose packaging material, printing paper, tracing paper and a packing material, wherein the peculiar, beautiful, opaque, dull-tone roughened surface thereof with a high density of unevenness can be made the most of.

TABLE 1

| Ex. No. or Comp. Ex. No. | | Hydrogenated Cyclopentadiene Type Petroleum Resin | | | | Characteristic Value of Film |
|---|---|---|---|---|---|---|
| | | Softening Point (°C.) | Bromine Number | Amount (parts by weight) | Homopolymer or Copolymer | Gloss Value (%) |
| Examples | 1 | 162 | 7 | 15 | P-E block copolymer A | 10 |
| | 2 | 175 | 10 | 10 | P-E block copolymer A | 12 |
| | 3 | 175 | 10 | 8 | P-E block copolymer A | 16 |
| | 4 | 192 | 8 | 10 | P-E block copolymer B | 10 |
| | 5 | 175 | 15 | 15 | P-E block copolymer B | 18 |
| Comparative Examples | 1 | 175 | 10 | 5 | P homopolymer | 80 |
| | 2 | 175 | 10 | 10 | P homopolymer | 67 |
| | 3 | 140 | 7 | 15 | P-E block copolymer A | 82 |
| | 4 | 120 | 7 | 15 | P-E block | 86 |

TABLE 1-continued

| Ex. No. or Comp. Ex. No. | Hydrogenated Cyclopentadiene Type Petroleum Resin | | | Homopolymer or Copolymer | Characteristic Value of Film |
| --- | --- | --- | --- | --- | --- |
| | Softening Point (°C.) | Bromine Number | Amount (parts by weight) | | Gloss Value (%) |
| | | | | copolymer A | |

(note)
P-E block copolymer A: propylene-ethylene block copolymer A (ethylene unit content = 8%, block index = 0.8%)
P-E block copolymer B: propylene-ethylene block copolymer B (ethylene unit content = 12%, block index = 1.6%)
P homopolymer: propylene homopolymer

Example 6

A crystalline ethylene-propylene random copolymer powder having a crystal melting point of 140° C., an MFR of 4.5 and an ethylene comonomer unit content of 4.5 wt. was blended with 0.10 wt. %, based on the copolymer powder, of a phenolic anti-oxidizing agent BHT, 0.1 wt. based on the copolymer powder, of calcium stearate, and 20 wt. %, based on the copolymer powder, of a hydrogenated cyclopentadiene type resin having a ring and ball softening point of 170° C. and a bromine number of 16, followed by mixing by means of a Henschel mixer. The resulting mixture was passed through an extruder to effect melt-mixing at 220° C. The molten mixture was cooled and cut to prepare a composition in the form of pellets.

The composition was melt-extruded through an extruder of 65 mm in cylinder diameter and a T die of 30 cm in width at a temperature of 230° C. and then cooled with cooling rolls kept at 40° C. to form a raw sheet of 0.2 mm in thickness, which was not foamed and had a density of 0.91.

Subsequently, the raw sheet was stretched in a longitudinal direction between two sets of nip rolls kept at 100° C. at a draw ratio of 5.3, followed by a heat treatment with 5% relaxation at a temperature of 80° C. while winding up the resulting longitudinally monoaxially stretched film. This stretched film was an opaque foamed material abundunt with fine uniform cells of foam and rich in surface gloss, which had a density of 0.55, a total light transmission of 15% and a heat shrinkability of 18% in the stretched direction.

Examples 7 to 11 and Comparative Examples 5 to 10

A crystalline ethylene-propylene-butene-1 terpolymer powder having a crystal melting point of 130° C., an MFR of 2.0, an ethylene comonomer unit content of 4.0 wt. % and a butene-1 comonomer unit content of 4.5 wt. % was blended with 0.1 wt. %, based on the terpolymer powder, of a phenolic anti-oxidizing agent BHT, 0.1 wt. %, based on the terpolymer powder, of Irganox 1010 (manufactured by Ciba-Geigy), 0.1 wt. %, based on the terpolymer powder, of calcium stearate and a predetermined weight percentage, based on the terpolymer powder and as listed in Table 2, of a hydrocarbon resin powder as listed in Table 2, followed by mixing by means of a Henschel mixer (trade name). The resulting mixture was further melt-mixed with a twin-screw extruder at 230° C. The molten mixture was cooled and cut to prepare a composition in the form of pellets.

The composition was melt-extruded through a single screw extruder of 40 mm in cylinder diameter and a T die of 300 mm in width at a temperature of 240° C. and then quickly cooled with mirror-surfaced cooling rolls kept at 40° C. to form an unstretched raw sheet of 1.0 mm in thickness, the density of which is listed in Table 2.

Subsequently, the raw sheet was cut into a square piece, which was then preheated with a pantograph type biaxial stretcher to a temperature of 110° C., at which the preheated raw sheet was stretched therewith 5.2-fold in each of longitudinal and lateral directions simultaneously in both directions, followed by a heat treatment at 110° C. for 10 seconds. According to the foregoing procedure, 11 kinds of biaxially stretched films were obtained. The characteristic values of these stretched films are also listed in Table 2.

As demonstrated in Table 2, the film of the terpolymer alone (Comparative Example 5) and the films of the terpolymer combined with a hydrogenated resin such as a hydrogenated alicyclic hydrocarbon resin or hydrogenated polyterpene or with a hydrogenated cyclopentadiene type resin having a ring and ball softening point lower than 160° C. (Comparative Examples 6 to 9) were none other than known common stretched films as is obvious from the densities and total light transmissions thereof, whereas the stretched films of the terpolymer combined with a hydrogenated cyclopentadiene type resin having a ring and ball softening point of at least 160° C. according to the present invention (Examples 7 to 11) were opaque with the respective low total light transmissions, foamed with fine cells as can be seen from the respective densities thereof, and improved in heat shrinkability as compared with the film of the terpolymer alone. Thus, it will be understandable that the stretched films of Examples 7 to 11 according to the present invention are novel foamed moldings with distinguishing features.

Comparative Example 11

A composition in the form of pellets was prepared through melt-mixing with an extruder in substantially the same manner as in Example 7 except that crystalline polypropylene having a crystal melting point of 163° C. and an MFR of 4.0 was used instead of the terpolymer used in the composition of Example 7. This composition was molded into a raw sheet in the same manner as in Example 7 and stretched 5.2-fold in both the longitudinal and lateral directions simultaneously in both directions by means of a pantograph type biaxial stretcher in substantially the same manner as in Example 7, followed by a heat treatment for 10 seconds. Thus, a biaxially stretched film was obtained. However, since the preheating and stretching temperature of 110° C. as employed in Example 7 was low enough to cause stretching rupture with a failure to obtain a stretched film, a preheating, stretching and heat treatment temperature of 151° C. was used. The obtained stretched film had a translucent appearance, a density of 0.87, a total light transmission of 72% and a heat shrinkability of 6%, all of which were unsatisfactory.

TABLE 2

| Ex. No. or Comp. Ex. No. | | Hydrocarbon Resin | | | Characteristics of Biaxially Stretched Film | | | |
|---|---|---|---|---|---|---|---|---|
| | | Kind | Softening Point (°C.) | Amount (%) | Density (g/cm²) | Total Light Transmission (%) | Heat Shrink-ability (%) | Forming* (by sight) |
| Examples | 7 | hydrogenated cyclopentadiene type resin[5] | 165 | 20.0 | 0.68 | 30 | 22 | uniform.fine (high gloss) |
| | 8 | hydrogenated cyclopentadiene type resin[5] | 165 | 7.0 | 0.78 | 41 | 17 | uniform.fine |
| | 9 | hydrogenated cyclopentadiene type resin[5] | 165 | 15.0 | 0.66 | 20 | 20 | uniform.fine highly opaque |
| | 10 | hydrogenated cyclopentadiene type resin[5] | 165 | 25.0 | 0.55 | 11 | 24 | uniform.fine highly opaque |
| | 11 | hydrogenated cyclopentadiene type copolymer[7] | 182 | 20.0 | 0.48 | 8 | 25 | uniform.fine highly opaque |
| Comparative Examples | 5 | (not added) | — | 0.0 | 0.91 | 97 | 11 | not foamed |
| | 6 | hydrogenated polyterpene[1] | 115 | 20.0 | 0.92 | 98 | 17 | not foamed |
| | 7 | alicyclic hydrocarbon resin[2] | 125 | 20.0 | 0.92 | 98 | 18 | not foamed |
| | 8 | alicyclic hydrocarbon resin[3] | 140 | 20.0 | 0.92 | 95 | 18 | not foamed |
| | 9 | hydrogenated cyclopentadiene type resin[4] | 140 173 | 20.0 | 0.92 | 96 | 17 | not foamed |
| | 10 | hydrogenated cyclopentadiene type resin[6] | | 3.0 | 0.88 | 70 | 12 | poorly foamed, unevenly transparent |

(Note)
The specifics of the hydrocarbon resins listed in the Table are as follows.
[1] Hydrogenated product of polyterpene of β-pinene as the major monomer component, which has a bromine number of 8.
[2] Hydrogenated product of an aromatic hydrocarbon resin: "Arkon P-125" manufactured by Arakawa Chemical Industry Co., Ltd.
[3] Hydrogenated product of an aromatic hydrocarbon resin: "Arkon P-140" manufactured by Arakawa Chemical Industry Co., Ltd.
[4-6] These were prepared by polymerizing a fraction obtained through steam cracking of naphtha and comprising cyclopentadiene and dicyclopentadiene as the major components according to a known method while controlling the polymerization time and hydrogenating the resulting polymer having a predetermined softening point in the presence of a nickel catalyst in such a way as to decrease the bromine number thereof to at most 12.
[7] This was prepared by polymerizing a mixture composed of 75% of a cyclopentadiene fraction and 25% of an aromatic hydrocarbon fraction in substantially the same manner as in the preparation of the above-mentioned resin[6] and hydrogenating the resulting copolymer in substantially the same manner as in the preparation of the resin.[6]
*The state of foaming was observed by sight to give thereto a rating of "not foamed" for a transparent state without any recognizable cells of foam or a rating of "uniform.fine" for a glossy whitened state with very small cells of foam, in the case of which mention of "highly opaque" was additionally made when the opaqueness was very high.

The heat-shrinkable foamed molding of the present invention contains uniform cells of foam and has a smooth surface excellent in gloss and capable of beautiful printing, as compared with conventional heat-shrinkable foamed moldings wherein a decomposition type foaming agent has been used. Accordingly, the heat-shrinkable foamed molding of the present invention can be suitably used as a packaging material and a tying material as well as in the form of labels for containers such as glass bottles, plastic bottles and metallic cans and in the form of protective covers capable of keeping bottles from breaking.

According to the process of the present invention, the above-mentioned heat-shrinkable foamed molding having excellent characteristics can be easily and efficiently produced.

What is claimed is:

1. A dulled stretched molding produced by melt-kneading and melt-extruding a blend composition comprising 100 parts by weight of a propylene-ethylene block copolymer and 3 to 40 parts by weight of a cyclopentadiene type petroleum resin having a ring and ball softening point of at least 160° C. and stretching the resulting flat molding in at least one direction in such a way as to make the resulting stretched molding have a roughened surface of at most 30% in gloss value with a high density of unevenness.

2. A process for producing a stretched molding, comprising (a) melt-extruding a blend composition comprising 100 parts by weight of a propylene-ethylene block copolymer and 3 to 40 parts by weight of a cyclopentadiene type petroleum resin having a ring and ball softening point of at least 160° C. to form a raw sheet and (b) stretching said raw sheet in at least one direction at a draw ratio of at least 2 at a stretching temperature of at most said ring and ball softening temperature of said cyclopentadiene type petroleum resin.

3. A heat-shrinkable foamed molding of at most 0.85 in density and at least 10% in heat shrinkability at 100° C., produced by melt-kneading and melt-extruding a blend composition comprising a crystalline propylene-α-olefin copolymer having a crystal melting point of at most 150° C. and 5 to 40 wt. %, based on said copolymer, of a hydrogenated cyclopentadiene type resin having a ring and ball softening point of at least 160° C. and stretching the resulting extrudate in at least one direction.

4. A heat-shrinkable foamed molding as claimed in claim 3, wherein said crystalline propylene-α-olefin copolymer contains at least 70 wt. % of propylene monomer units and has a melt flow rate (MFR) of 0.1 to 10, and wherein said crystalline propylene-α-olefin copolymer is at least one member selected from the group consisting of a crystalline ethylene-propylene random copolymer, a crystalline propylene-butene-1 copolymer, a crystalline ethylene-propylene-butene-1 copolymer, and a crystalline ethylene-propylene-hexene-1 copolymer.

5. A heat-shrinkable foamed molding as claimed in claim 3, wherein said hydrogenated cyclopentadiene type resin is at least one member selected from the group consisting of a hydrogenated cyclopentadiene polymer, a hydrogenated dicyclopentadiene polymer, hydrogenated copolymers of cyclopentadiene with at least one aromatic hydrocarbon, and hydrogenated copolymers of dicyclopentadiene with at least one aromatic hydrocarbon.

6. A heat-shrinkable foamed molding as claimed in claim 3, wherein said blend composition comprises such a propylene-α-olefin copolymer and such a hydrogenated cyclopentadiene type resin as to provide a difference of at least 20° C. between said crystal melting point of the former and said ring and ball softening point of the latter.

7. A process for producing a heat-shrinkable foamed molding, comprising (a) melt-extruding a blend composition comprising a crystalline propylene-α-olefin copolymer having a crystal melting point of at most 150° C. and 5 to 40 wt. %, based on said copolymer, of a hydrogenated cyclopentadiene type resin having a ring and ball softening point of at least 160° C. to form a raw sheet and (b) stretching said raw sheet in at least one direction at a draw ratio of at least 3 at a stretching temperature 10° C. or more lower than said crystal melting point of said copolymer.

8. A process for producing a heat-shrinkable foamed molding as claimed in claim 7, wherein said crystalline propylene-α-olefin copolymer contains at least 70 wt. % of propylene monomer units and has a melt flow rate (MFR) of 0.1 to 10, and wherein said crystalline propylene-α-olefin copolymer is at least one member selected from the group consisting of a crystalline ethylene-propylene random copolymer, a crystalline propylene-butene-1 copolymer, a crystalline ethylene-propylene-butene-1 copolymer, and a crystalline ethylene-propylene-hexene-1 copolymer 9. A process for producing a heat-shrinkable foamed molding as claimed in claim 7, wherein said hydrogenated cyclopentadiene type resin is at least one member selected from the group consisting of a hydrogenated cyclopentadiene polymer, a hydrogenated dicyclopentadiene polymer, hydrogenated copolymers of cyclopentadiene with at least one aromatic hydrocarbon, and hydrogenated copolymers of dicyclopentadiene with at least one aromatic hydrocarbon.

10. A process for producing a heat-shrinkable foamed molding as claimed in claim 7, wherein said blend composition comprises such a propylene-α-olefin copolymer and such a hydrogenated cyclopentadiene type resin as to provide a difference of at least 20° C. between said crystal melting point of the former and said ring and ball softening point of the latter.

* * * * *